US010898970B2

(12) United States Patent
Ishiguro et al.

(10) Patent No.: US 10,898,970 B2
(45) Date of Patent: Jan. 26, 2021

(54) LASER PROCESSING MACHINE

(71) Applicant: AMADA HOLDINGS CO., LTD., Kanagawa (JP)

(72) Inventors: Hiroaki Ishiguro, Kanagawa (JP); Ryouhei Ito, Kanagawa (JP); Tetsuya Kobayashi, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/621,955

(22) PCT Filed: May 23, 2018

(86) PCT No.: PCT/JP2018/019745
§ 371 (c)(1),
(2) Date: Dec. 12, 2019

(87) PCT Pub. No.: WO2018/235509
PCT Pub. Date: Dec. 27, 2018

(65) Prior Publication Data
US 2020/0189029 A1    Jun. 18, 2020

(30) Foreign Application Priority Data
Jun. 20, 2017   (JP) .................................. 2017-120382

(51) Int. Cl.
*B23K 26/066*   (2014.01)
*B23K 26/06*    (2014.01)
(Continued)

(52) U.S. Cl.
CPC ...... *B23K 26/0665* (2013.01); *B23K 26/0648* (2013.01); *B23K 26/0652* (2013.01);
(Continued)

(58) Field of Classification Search
CPC .... G02B 7/16; B23K 26/064; B23K 26/0648; B23K 26/0652; B23K 26/0665;
(Continued)

(56) References Cited

U.S. PATENT DOCUMENTS

| 5,660,748 A | * | 8/1997 | Tanaka | B23K 26/06 |
|  |  |  |  | 219/121.6 |
| 7,193,693 B2 | * | 3/2007 | Yazaki | B23K 26/073 |
|  |  |  |  | 219/121.73 |

(Continued)

FOREIGN PATENT DOCUMENTS

| JP | 2001-520938 A | 11/2001 |
| JP | 2005-257735 A | 9/2005 |

(Continued)

OTHER PUBLICATIONS

International Search Report issued in International Patent Application No. PCT/JP2018/019745, dated Aug. 21, 2018 and an English translation.

(Continued)

*Primary Examiner* — Ibrahime A Abraham
*Assistant Examiner* — Frederick F Calvetti
(74) *Attorney, Agent, or Firm* — Greenblum & Bernstein, P.L.C.

(57) ABSTRACT

A profile selector includes at least one beam-forming lens refracting a laser beam to be incident so as to convert a beam profile and emits a laser beam having a beam profile selected from a plurality of beam profiles. A collimating lens converts a laser beam of a divergent beam to be incident into collimated light. A focusing lens focuses the collimated light emitted from the collimating lens and irradiates the focused beam to a sheet metal of a processing target. A moving mechanism moves the collimating lens along an optical axis such that a deviation of a focal point is reduced caused when (Continued)

the beam profile of the focused beam emitted from the focusing lens is selected by the profile selector.

6 Claims, 7 Drawing Sheets

(51) Int. Cl.
  *B23K 26/70*    (2014.01)
  *B23K 26/073*   (2006.01)
  *B23K 26/21*    (2014.01)
  *B23K 26/359*   (2014.01)
  *B23K 26/38*    (2014.01)

(52) U.S. Cl.
  CPC ...... *B23K 26/0732* (2013.01); *B23K 26/0734* (2013.01); *B23K 26/702* (2015.10); *B23K 26/21* (2015.10); *B23K 26/359* (2015.10); *B23K 26/38* (2013.01)

(58) Field of Classification Search
  CPC .............. B23K 26/073; B23K 26/0732; B23K 26/0734; B23K 26/21; B23K 26/359; B23K 26/38; B23K 26/702
  See application file for complete search history.

(56) References Cited

U.S. PATENT DOCUMENTS

| | | | | |
|---|---|---|---|---|
| 8,350,188 | B2* | 1/2013 | Schulz | B23K 26/0617 |
| | | | | 219/121.72 |
| 9,757,816 | B2* | 9/2017 | Fujita | B23K 26/046 |
| 10,300,558 | B2* | 5/2019 | Sako | B23K 26/142 |
| 10,413,995 | B2* | 9/2019 | Webster | B23K 26/14 |
| 10,583,525 | B2* | 3/2020 | Ito | B23K 26/38 |
| 2007/0161973 | A1 | 7/2007 | Goder et al. | |
| 2007/0193984 | A1* | 8/2007 | Kawai | B23K 26/082 |
| | | | | 219/121.63 |
| 2009/0032510 | A1* | 2/2009 | Ando | B23K 26/0676 |
| | | | | 219/121.72 |
| 2009/0326522 | A1* | 12/2009 | Goder | B23K 26/073 |
| | | | | 606/5 |
| 2010/0072180 | A1* | 3/2010 | Schuermann | B23K 26/38 |
| | | | | 219/121.67 |
| 2010/0174273 | A1* | 7/2010 | Murakami | A61F 9/00821 |
| | | | | 606/4 |
| 2011/0248005 | A1* | 10/2011 | Briand | B23K 26/38 |
| | | | | 219/121.72 |
| 2012/0031883 | A1* | 2/2012 | Kumamoto | B23K 26/38 |
| | | | | 219/121.78 |
| 2013/0044371 | A1* | 2/2013 | Rupp | B23K 26/073 |
| | | | | 359/432 |
| 2013/0148925 | A1* | 6/2013 | Muendel | B23K 26/0734 |
| | | | | 385/27 |
| 2014/0072003 | A1* | 3/2014 | Matsumoto | B23K 26/046 |
| | | | | 372/26 |
| 2014/0076870 | A1* | 3/2014 | Hirano | B23K 26/0648 |
| | | | | 219/121.75 |
| 2016/0116679 | A1* | 4/2016 | Muendel | G02B 6/4296 |
| | | | | 385/11 |
| 2018/0154481 | A1* | 6/2018 | Valentin | G02B 27/0955 |
| 2018/0169792 | A1* | 6/2018 | Sako | B23K 26/142 |
| 2018/0178320 | A1* | 6/2018 | Webster | B23K 31/125 |
| 2019/0084082 | A1* | 3/2019 | Ito | B23K 26/38 |
| 2019/0126395 | A1* | 5/2019 | Nakamura | B23K 26/38 |
| 2019/0299327 | A1* | 10/2019 | Webster | B23K 26/0648 |

FOREIGN PATENT DOCUMENTS

| | | |
|---|---|---|
| JP | 2013-132651 A | 7/2013 |
| JP | 2015-500571 A | 1/2015 |
| WO | 2011/124671 A1 | 10/2011 |
| WO | 2012/157355 A1 | 11/2012 |

OTHER PUBLICATIONS

Written Opinion of the International Searching Authority issued in International Application No. PCT/JP2018/019745, dated Aug. 21, 2018 and an English translation.

Decision to Grant a Patent in corresponding JP Patent Appl. No. 2017-120382, dated Aug. 14, 2018, and an English translation.

\* cited by examiner

LASER PROCESSING MACHINE

TECHNICAL FIELD

The present disclosure relates to a laser processing machine that processes a sheet metal using a laser beam.

BACKGROUND ART

A laser processing machine that processes a sheet metal such that the sheet metal is cut, welded, or marked using a laser beam emitted from a laser oscillator is widely used. In the laser processing machine, various laser oscillators are used. In order to cut a sheet metal having a relatively small thickness with a high speed, a fiber laser oscillator is frequently used, for example.

CITATION LIST

Patent Literature

[Patent Literature 1]: Japanese Translation of PCT International Application Publication No. JP-T-2015-500571
[Patent Literature 1]: International Publication WO2011/124671

SUMMARY OF THE INVENTION

In the laser processing machine, it is necessary to appropriately set a beam profile of a laser beam irradiated to a sheet metal depending on processing conditions of sheet metal. Patent Literature 1 and 2 disclose a laser processing machine in which one beam profile can be selected from a plurality of beam profiles to process a sheet metal.

The configuration for selecting a beam profile described in Patent Literature 1 and 2 is complex, and a laser processing machine in which a beam profile can be selected with a simple and inexpensive configuration is desired.

An object of embodiments is to provide a laser processing machine in which one beam profile can be selected from a plurality of beam profiles to process a sheet metal with a simple and inexpensive configuration.

An aspect of embodiments provides a laser processing machine including: a profile selector that includes at least one beam-forming lens refracting a laser beam to be incident so as to convert a beam profile and emit a laser beam having a beam profile selected from a plurality of beam profiles; a collimating lens configured to convert an incident laser beam of a divergent beam into collimated light; a focusing lens configured to focus the collimated light emitted from the collimating lens, and to irradiate the focused beam to a sheet metal of a processing target; and a moving mechanism configured to move the collimating lens along an optical axis such that a deviation of a focal point is reduced caused when the beam profile of the focused beam emitted from the focusing lens is selected by the profile selector.

In accordance with the laser processing machine according to embodiments, it is possible to select one beam profile from a plurality of beam profiles to process a sheet metal with a simple and inexpensive configuration.

MODES FOR CARRYING OUT THE INVENTION

Hereinafter, a laser processing machine according to first to fourth embodiments will be described with reference to the accompanying drawings. In the laser processing machine according to first to fourth embodiments, components having the same functions will be represented by the same reference numerals, and the description thereof will be omitted.

First Embodiment

Figure 1:
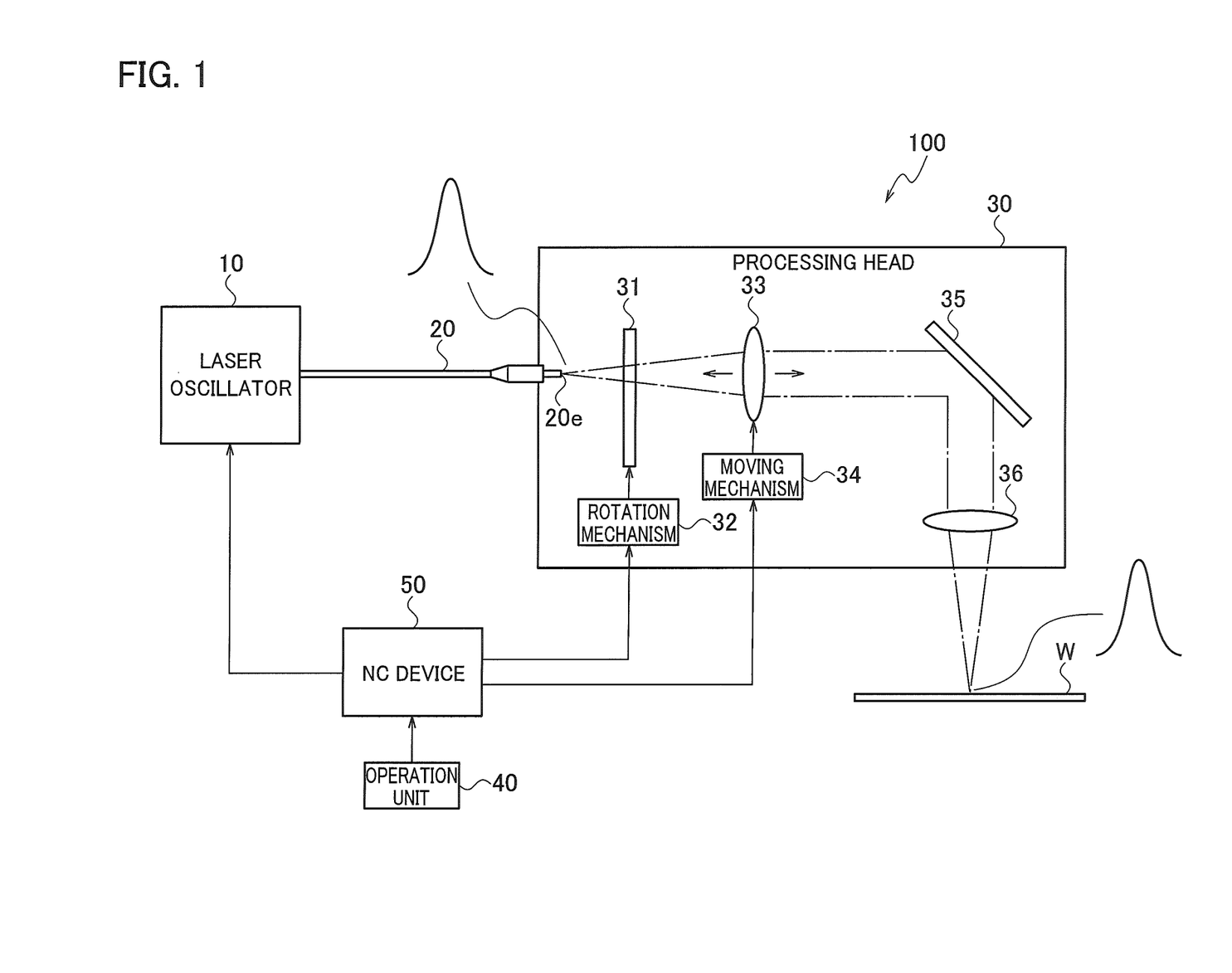
FIG. 1 is a diagram illustrating an overall configuration example of a laser processing machine according to a first embodiment.

In FIG. 1, a laser processing machine 100 includes: a laser oscillator 10 that generates and emits a laser beam; a processing head 30 that irradiates a laser beam to a sheet metal W of a processing target to process the sheet metal W; and a process fiber 20 that transmits the laser beam emitted from the laser oscillator 10 to a processing head 30. In addition, the laser processing machine 100 includes: an operation unit 40; and an NC device 50 that controls the laser oscillator 10 and the processing head 30. The NC device 50 is an example of a control device.

As the laser oscillator 10, a laser oscillator that amplifies an excitation beam emitted from a laser diode to emit a laser beam having a predetermined wavelength, or a laser oscillator that directly uses a laser beam emitted from a laser diode is preferable. Examples of the laser oscillator 10 include a solid laser oscillator, a fiber laser oscillator, a disk laser oscillator, and a direct diode laser oscillator (DDL oscillator).

The laser oscillator 10 emits a 1 μm band laser beam having a wavelength of 900 nm to 1100 nm as indicated by a one-dot chain line. When a fiber laser oscillator or a DDL oscillator is taken as an example, the fiber laser oscillator emits a laser beam having a wavelength of 1060 nm to 1080 nm, and the DDL oscillator emits a laser beam having a wavelength of 910 to 950 nm.

The processing head 30 includes: a profile selector 31 that selects a beam profile of the laser beam irradiated to the sheet metal W; and a rotation mechanism 32 that rotates the profile selector 31 to select one beam profile from a plurality of beam profiles. The beam profile is characteristic showing the intensity distribution when a laser beam is seen from a cross-section.

A laser beam emitted from an emission end 20e of the process fiber 20 is a divergent beam and is incident on the profile selector 31. As illustrated in FIG. 1, the beam profile of the laser beam emitted from the process fiber 20 is a Gaussian beam profile in which the intensity increases sharply from a peripheral portion toward a center portion.

The laser beam emitted from the profile selector 31 is incident on a collimating lens 33. The collimating lens 33 converts the laser beam of the incident divergent beam into collimated light. As described below, the collimating lens 33 is configured to be movable in an optical axis direction by a moving mechanism 34.

The collimated light emitted from the collimating lens 33 is incident on a bend mirror 35. The bend mirror 35 bends a direction of the incident laser beam by 90 degrees and allows the laser beam to be incident on a focusing lens 36. The focusing lens 36 focuses the collimated light such that the focal point is on or near the surface of the sheet metal W, and irradiates the focused beam to the sheet metal W.

Although not illustrated in the drawing, the processing head 30 is configured to be movable along the surface of the sheet metal W in a state where it is separated from the surface of the sheet metal W by a predetermined distance.

Figure 2:
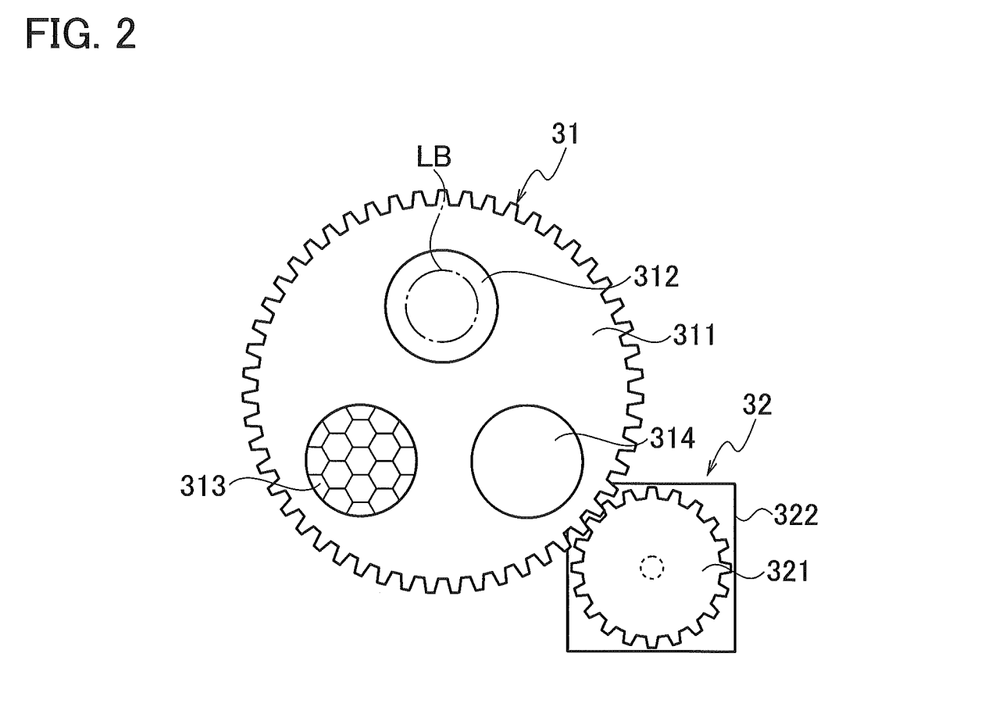
FIG. 2 is a plan view illustrating a configuration example of a profile selector 31 and a rotation mechanism 32 in FIG. 1.

As illustrated in FIG. 2, the profile selector 31 includes: a circular glass plate 312 that does not form a beam; and a circular base plate 311 to which two circular beam-forming lenses 313 and 314 are fitted. The base plate 311 is an aluminum metal plate, for example. The glass plate 312 and the beam-forming lenses 313 and 314 have a diameter of about 10 mm.

The glass plate 312 and the beam-forming lenses 313 and 314 are disposed on the base plate 311 such that the centers of the respective circle thereof are positioned on one circumference. Teeth are formed on the outer peripheral portion of the base plate 311.

The rotation mechanism 32 includes: a gear 321 that meshes with the teeth of the base plate 311; and a motor 322 that rotates the base plate 311 by rotating the gear 321. By rotating the motor 322, the base plate 311 rotates around the center of the base plate 311 as a rotation axis such that any one of the glass plate 312 and the beam-forming lenses 313 and 314 can be selectively positioned on the optical axis of the laser beam.

When the glass plate 312 is positioned on the optical axis of the laser beam, the glass plate 312 does not form a beam. Therefore, the profile selector 31 emits the Gaussian beam as it is. In FIG. 2, a circle LB indicated by a one-dot chain line represents a cross-section of the beam. Instead of fitting the glass plate 312 to the base plate 311, an opening through which the beam passes as it is may be formed.

The profile selector 31 may include a non-beamforming portion that emits a Gaussian type laser beam as the Gaussian type laser beam without beamforming. The glass plate 312 or the opening is the non-beamforming portion. In FIG. 2, the profile selector 31 includes the two beam-forming lenses 313 and 314. However, the profile selector 31 may include any one of the beam-forming lenses 313 and 314.

FIG. 1 illustrates a state where the profile selector 31 is set such that the glass plate 312 is positioned on the optimum axis of the laser beam. Accordingly, the Gaussian beam is irradiated to the sheet metal W to process the sheet metal W. The focal point of the beam irradiated to the sheet metal W is set to an optimal position in a state where the profile selector 31 is in the state of FIG. 1.

Figure 3:
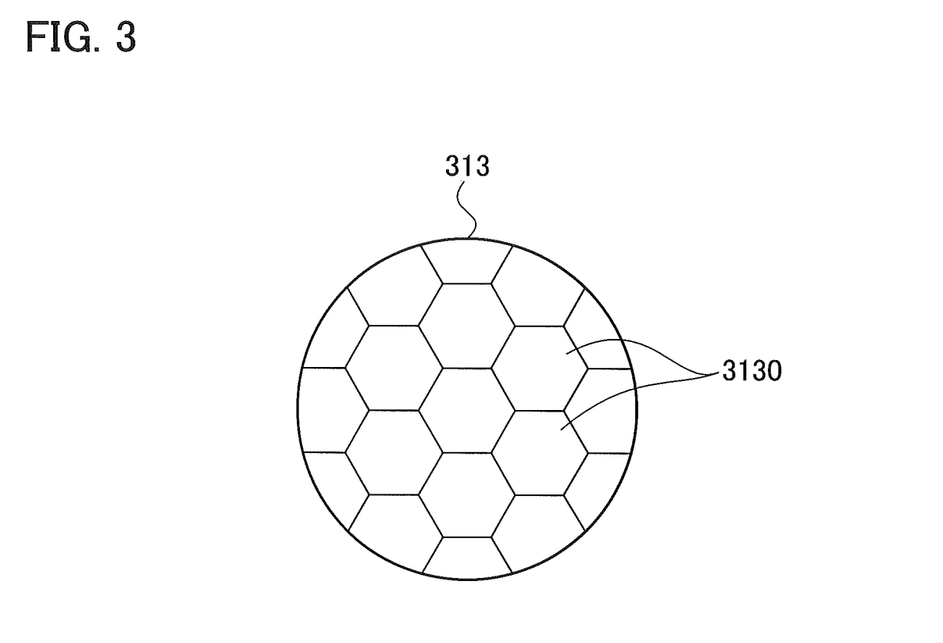
FIG. 3 is a plan view illustrating a configuration example of a beam-forming lens 313 (facet lens) included in the profile selector 31.

The beam-forming lens 313 is a facet lens as an example. As illustrated in FIG. 3, the beam-forming lens 313 that is the facet lens is a convex lens having a surface (laser beam incident surface) on which a plurality of hexagonal planes 3130 are formed. The beam-forming lens 313 is not limited to the shape illustrated in FIG. 3, and may be configured to be a convex lens having a surface on which a plurality of quadrangular planes are formed. The beam-forming lens 313 may be a facet lens having a laser beam incident surface on which a plurality of quadrangular or more polygonal planes are formed. Note that the facet lens is a compound eye lens, and a plurality of facet (small plane) light intensity surfaces may be generated at the focusing position.

Figure 4:
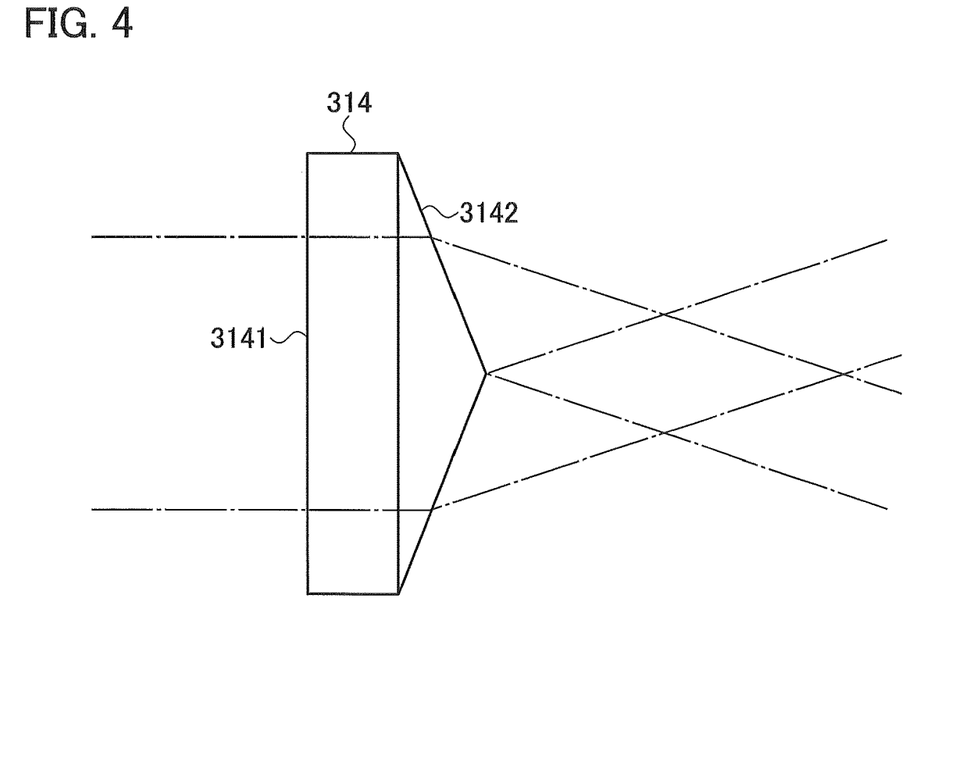
FIG. 4 is a side view illustrating a configuration example of a beam-forming lens 314 (axicon lens) included in the profile selector 31.

The beam-forming lens 314 is an axicon lens as an example. As illustrated in FIG. 4, the beam-forming lens 314 that is the axicon lens is a rotationally-symmetric prism in which an incident surface 3141 of the laser beam is planar and an emission surface 3142 of the laser beam is conical.

Figure 5:
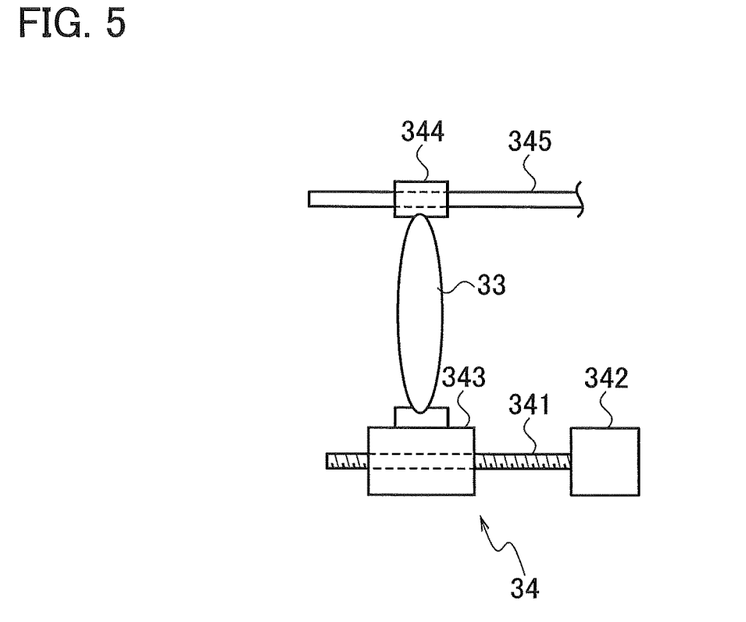
FIG. 5 is a side view illustrating a configuration example of a moving mechanism 34 in FIG. 1.

FIG. 5 illustrates an example of a schematic configuration of the moving mechanism 34 that moves the collimating lens 33 in the optical axis direction. The moving mechanism 34 is configured to include a ball screw, for example. The collimating lens 33 is held by a holding portion 343 and a holding portion 344, the holding portion 343 functioning as a nut in which a female screw is formed on an inner peripheral surface, and the holding portion 344 having a configuration through which a shaft 345 penetrates. A male screw of a screw axis 341 surface and a female screw of the holding portion 343 mesh with each other through balls. By rotating the motor 342, the collimating lens 33 moves along the screw axis 341 and the shaft 345.

The moving mechanism 34 may be configured with any one of a gear, a belt, a rack-and-pinion, a worm gear, a ball screw and the like (or any combination thereof), and a driver such as a motor. The configuration of the moving mechanism 34 is arbitrary.

Figure 6:
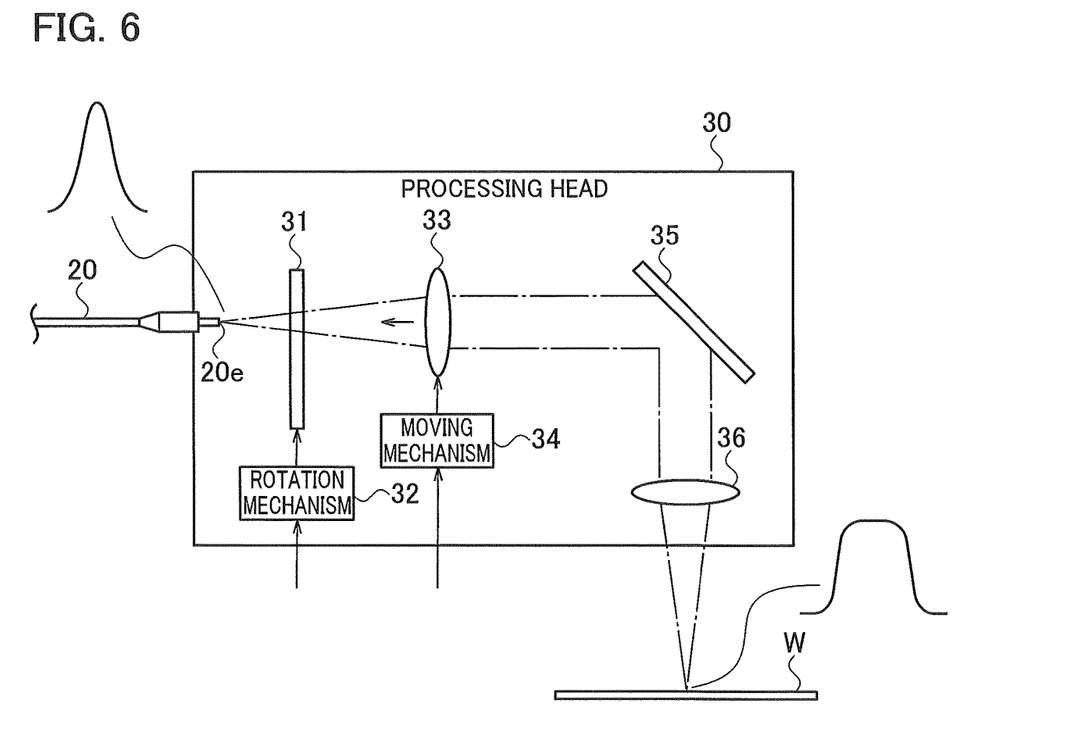
FIG. 6 is a diagram illustrating a state where the profile selector 31 is set such that the beam-forming lens 313 is positioned on an optical axis of a laser beam in the laser processing machine according to a first embodiment.
Figure 7:
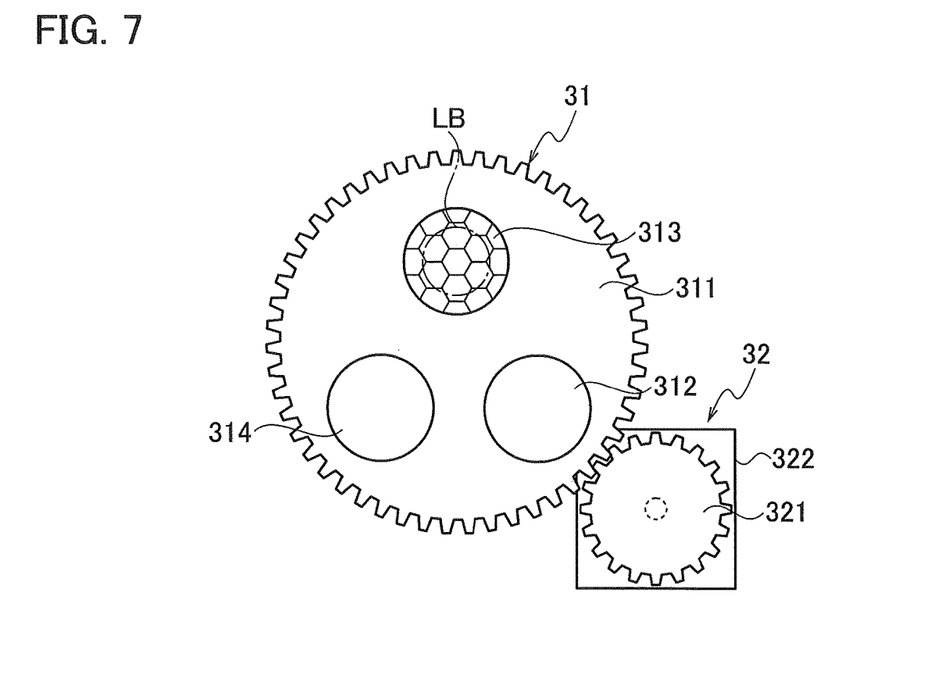
FIG. 7 is a plan view illustrating the profile selector 31 in a state where the beam-forming lens 313 is set to be positioned on the optical axis of the laser beam.

FIG. 6 illustrates a state where the profile selector 31 is set such that the beam-forming lens 313 is positioned on the optical axis of the laser beam as illustrated in FIG. 7. The beam-forming lens 313 refracts the laser beam to be incident such that the Gaussian beam is converted into a top-hat (flat top) beam having a beam profile with a flat center portion.

When the beam-forming lens 313 converts the Gaussian beam into the top-hat beam, the beam diameter is widened. Therefore, when the collimating lens 33 is positioned at the position illustrated in FIG. 1, the focal point of the laser beam irradiated to the sheet metal W moves up further than the focal point illustrated in FIG. 1. Therefore, the NC device 50 causes the moving mechanism 34 to move the collimating lens 33 to the profile selector 31 side in a direction parallel to the optical axis.

For example, the NC device 50 causes the moving mechanism 34 to move the collimating lens 33 to the profile selector 31 side such that the beam diameter is reduced by the amount in which the beam diameter is widened by the beam-forming lens 313. As a result, in FIG. 6, the top-hat beam is emitted to the sheet metal W at the same focal point as that illustrated in FIG. 1.

The profile selector 31 may intentionally adjust the focal point to be different from that illustrated in FIG. 1 in a state where it is set such that the beam-forming lens 313 is positioned on the optical axis of the laser beam.

The moving mechanism 34 may move the collimating lens 33 along an optical axis such that a deviation of the focal point caused when the beam profile of the focused beam emitted from the focusing lens 36 is selected by the profile selector 31 is reduced.

When it is assumed that the focal point of the beam irradiated to the sheet metal W is set to an optimum position in a state where the profile selector 31 is in the state of FIG. 6 and the profile selector 31 is switched to the state of FIG. 1, the focal point moves down further than the focal point illustrated in FIG. 6. In this case, the NC device 50 may cause the moving mechanism 34 to move the collimating lens 33 to the bend mirror 35 side.

Figure 8:
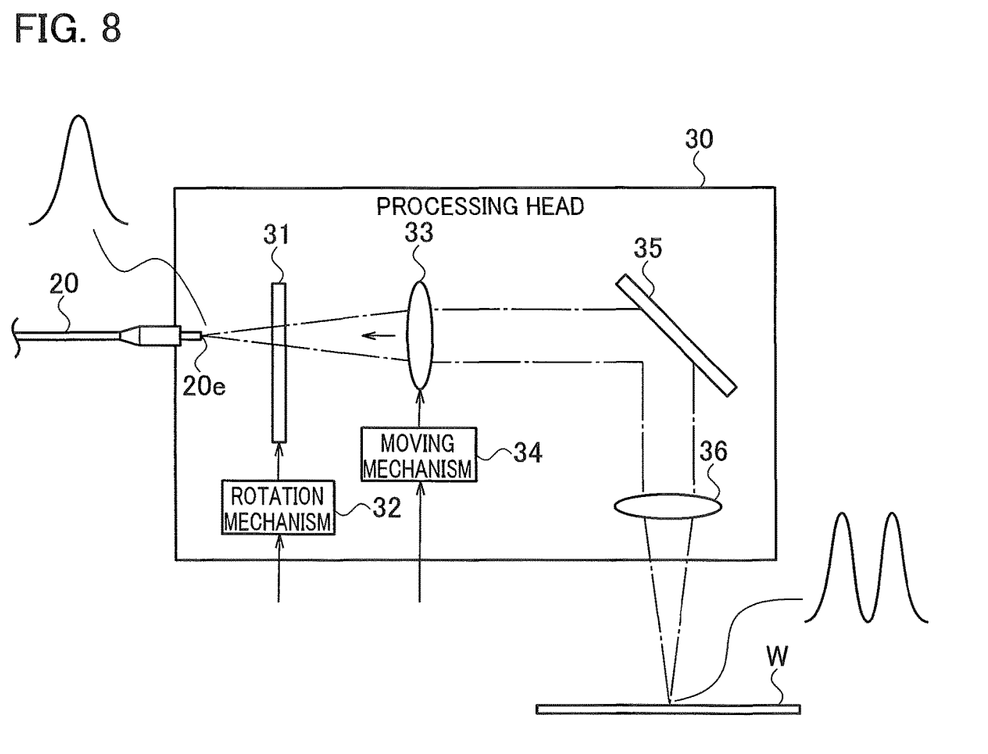
FIG. 8 is a diagram illustrating a state where the profile selector 31 is set such that the beam-forming lens 314 is positioned on the optical axis of the laser beam in the laser processing machine according to a first embodiment.
Figure 9:
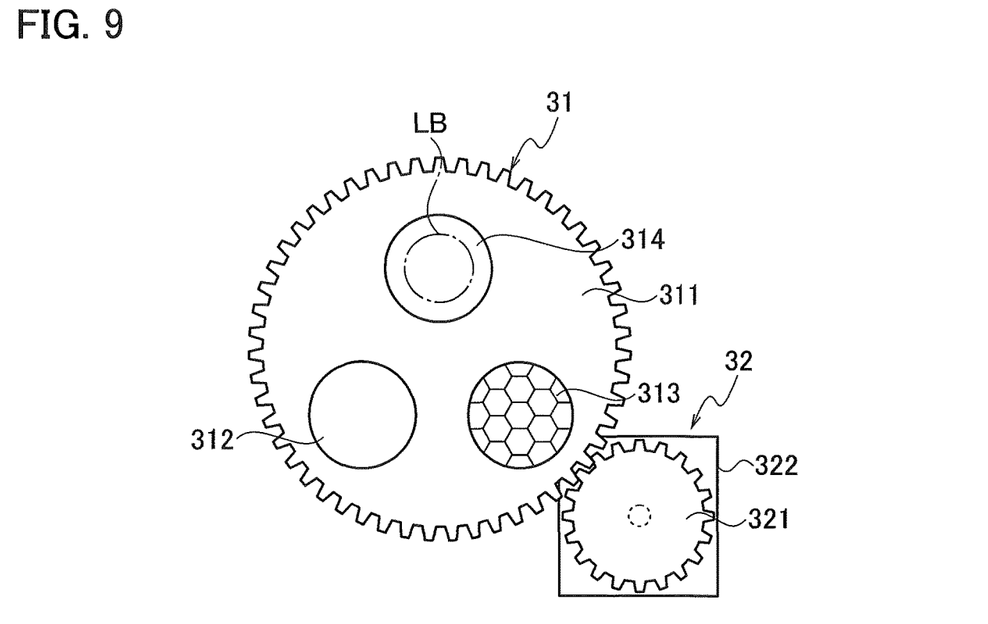
FIG. 9 is a plan view illustrating the profile selector 31 in a state where the beam-forming lens 314 is set to be positioned on the optical axis of the laser beam.

FIG. 8 illustrates a state where the profile selector 31 is set such that the beam-forming lens 314 is positioned on the optical axis of the laser beam as illustrated in FIG. 9. The beam-forming lens 314 refracts the laser beam to be incident such that the Gaussian beam is converted into a ring (donut) beam having a ring beam profile in which the intensity at a center portion is low and the intensity at a peripheral portion is high.

Likewise, when the beam-forming lens 314 converts the Gaussian beam into the ring beam, the beam diameter is widened. Therefore, when the collimating lens 33 is positioned at the position illustrated in FIG. 1, the focal point of the laser beam emitted to the sheet metal W moves up further than the focal point illustrated in FIG. 1. Therefore, the NC device 50 causes the moving mechanism 34 to move the collimating lens 33 to the profile selector 31 side in a direction parallel to the optical axis.

In FIG. 8, the NC device 50 moves the collimating lens to the profile selector 31 side such that the beam diameter is reduced by the amount in which the beam diameter is widened by the beam-forming lens 314. As a result, the ring beam is irradiated to the sheet metal W at the same focal point as that illustrated in FIG. 1.

The profile selector 31 may intentionally adjust the focal point to be different from that illustrated in FIG. 1 in a state where it is set such that the beam-forming lens 314 is positioned on the optical axis of the laser beam.

When it is assumed that the focal point of the beam emitted to the sheet metal W is set to an optimum position in a state where the profile selector 31 is in the state of FIG. 8 and the profile selector 31 is switched to the state of FIG. 1, the focal point moves down further than the focal point illustrated in FIG. 8. Even in this case, the NC device 50 may cause the moving mechanism 34 to move the collimating lens 33 to the bend mirror 35 side.

When the focal point varies between the time of use of the beam-forming lens 313 and the time of use of the beam-forming lens 314 and it is necessary to adjust the focal point, the collimating lens 33 may be moved by the moving mechanism 34.

Second Embodiment

Figure 10:
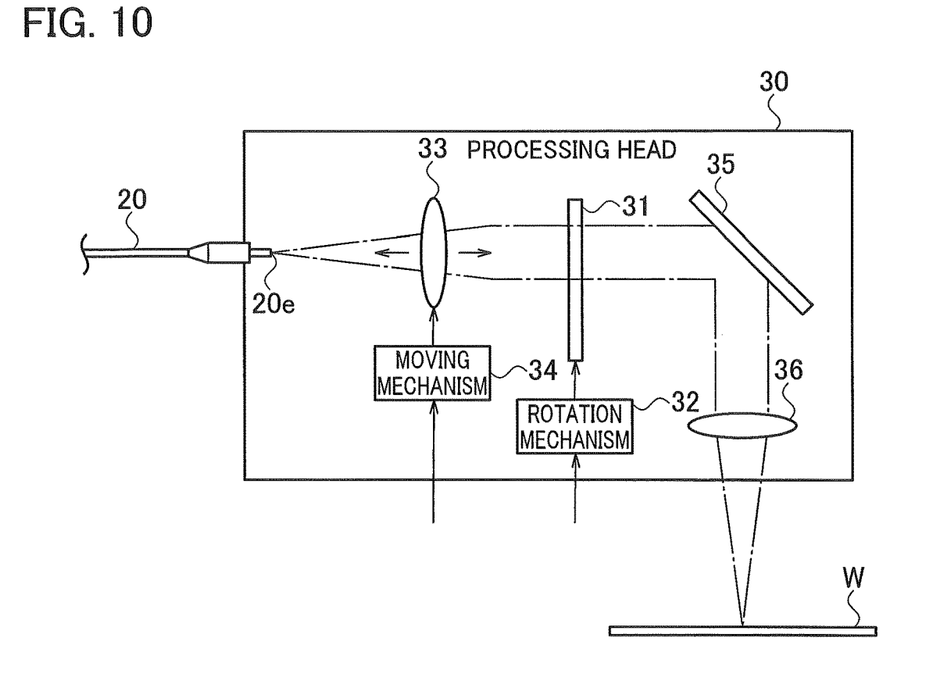
FIG. 10 is a diagram illustrating an overall configuration example of a laser processing machine according to a second embodiment.

As illustrated in FIG. 10, the profile selector 31 may be disposed between the collimating lens 33 and the bend mirror 35. When the profile selector 31 is disposed between the collimating lens 33 and the bend mirror 35, the beam diameter of the laser beam incident on the profile selector 31 increases. Accordingly, it is necessary that the glass plate 312 and the beam-forming lenses 313 and 314 have a diameter of about 20 to 25 mm.

As described above, according to a first embodiment, the glass plate 312 and the beam-forming lenses 313 and 314 may have a diameter of 10 mm. Therefore, according to a first embodiment, a lower cost can be realized. Accordingly, a first embodiment is preferable to a second embodiment.

Third Embodiment

Figure 11:
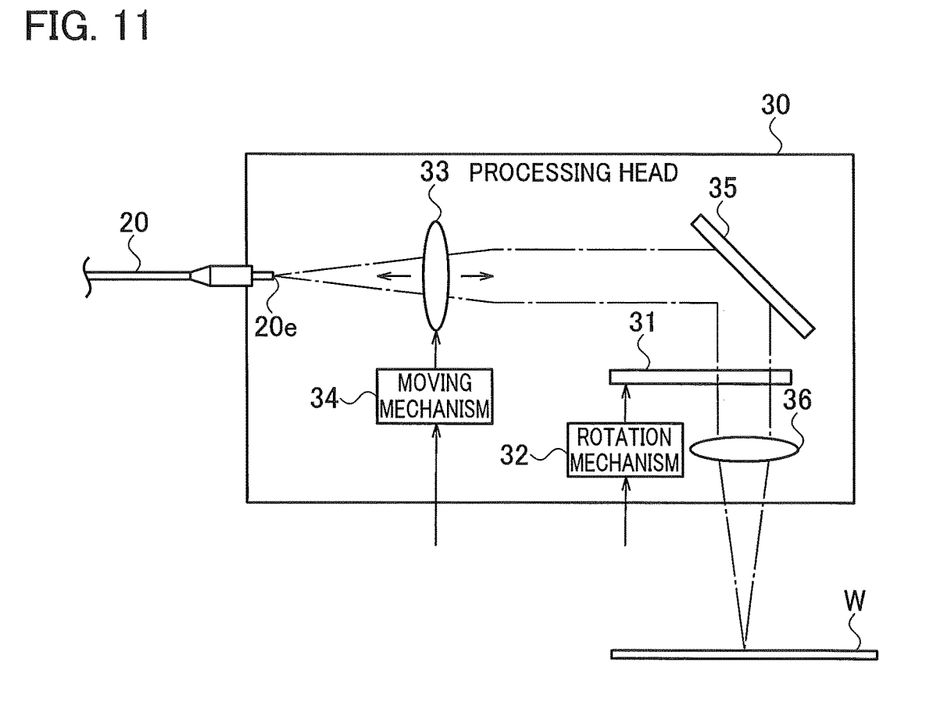
FIG. 11 is a diagram illustrating an overall configuration example of a laser processing machine according to a third embodiment.

As illustrated in FIG. 11, the profile selector 31 may be disposed between the bend mirror 35 and the focusing lens 36. Even in this case, it is necessary that the glass plate 312 and the beam-forming lenses 313 and 314 have a diameter of about 20 to 25 mm. Accordingly, a first embodiment is preferable to a third embodiment.

Fourth Embodiment

Figure 12:
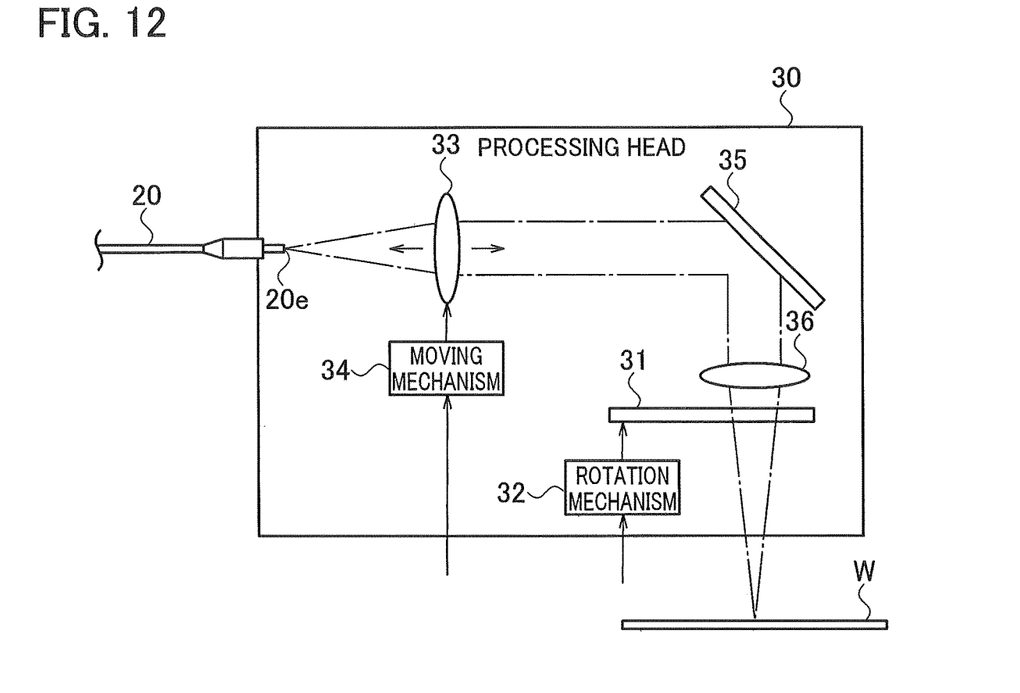
FIG. 12 is a diagram illustrating an overall configuration example of a laser processing machine according to a fourth embodiment.

As illustrated in FIG. 12, the profile selector 31 may be disposed between the focusing lens 36 and the sheet metal W. Even in this case, it is necessary that the glass plate 312 and the beam-forming lenses 313 and 314 have a diameter of about 20 to 25 mm. Accordingly, a first embodiment is preferable to a fourth embodiment.

Figure 13:
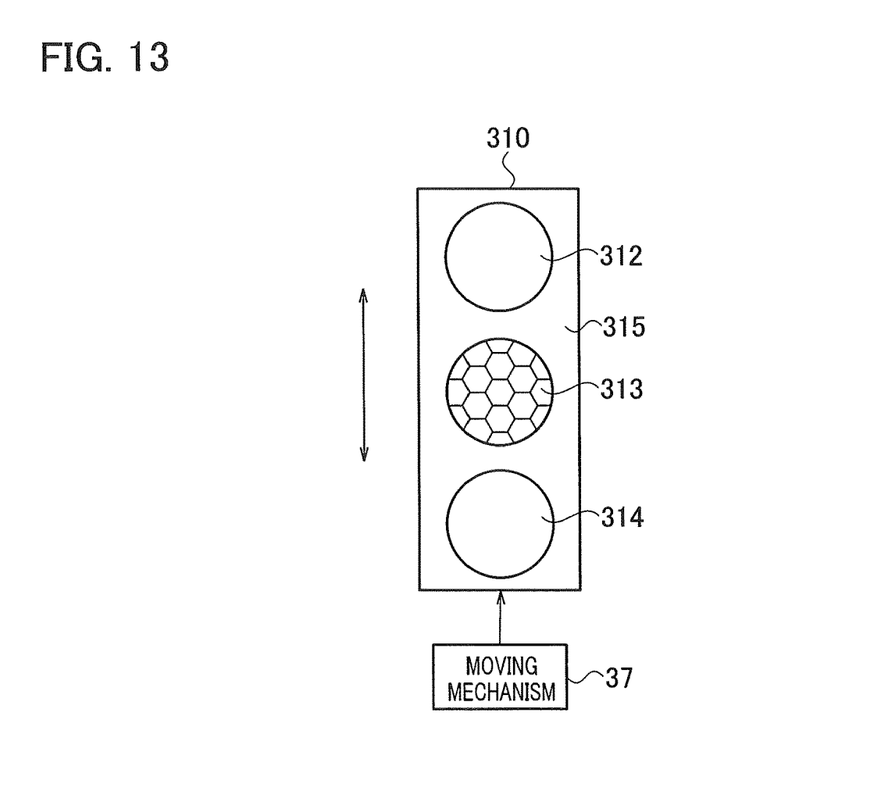
FIG. 13 is a diagram illustrating a rectangular profile selector 310 that is a modification example of the laser processing machine according to first to fourth embodiments.

A modification example of first to fourth embodiments may have the following configuration. As illustrated in FIG. 13, in the laser processing machine 100, a profile selector 310 in which the glass plate 312 and the beam-forming lenses 313 and 314 are linearly aligned on the rectangular base plate 315 may be used instead of the circular profile selector 31. In this case, in the laser processing machine 100, a moving mechanism 37 that slides the profile selector 310 may be provided instead of the rotation mechanism 32. The moving mechanism 37 may have the same configuration as the moving mechanism 34 illustrated in FIG. 5.

In the above-described first to fourth embodiments, the operator can cause the NC device 50 to set the material, the thickness, and the processing method of the sheet metal W by operating the operation unit 40. The NC device 50 causes the profile selector 31 (or 310) to select an optimum beam profile according to at least one of the materials, the thickness, and the processing method of the sheet metal W. The NC device 50 may select an optimum beam profile according to an optional combination of at least two of the material, the thickness, and the processing method of the sheet metal W.

When the sheet metal W is a thin sheet having a thickness of less than 4 mm, the NC device 50 preferably selects a beam profile having a small beam diameter and a high energy density, for example, the Gaussian beam profile illustrated in FIG. 1. As a result, the laser processing machine 100 can cut the sheet metal W with high speed.

When the sheet metal W is formed of stainless steel or aluminum and has a thickness of 4 mm or more, the NC device 50 may select the top-hat beam profile illustrated in FIG. 6. The top-hat beam profile is also suitable for welding or quenching.

When the sheet metal W is a thick plate formed of mild steel and having a thickness of 9 mm or more, the NC device 50 may select the ring beam profile illustrated in FIG. 8.

As described above, in the laser processing machine according first to fourth embodiments, one beam profile can be selected from a plurality of beam profiles using the profile selector 31 or 310 simply by selectively positioning the non-beamforming portion (the glass plate 312 or the opening) and the first or the second beam-forming lens (313 or 314) on the optical axis of the laser beam. With a simpler and less expensive configuration than the configuration described in Patent Literature 1 and 2, one beam profile can be selected from a plurality of beam profiles to process the sheet metal W.

The present disclosure relates to the subject matter disclosed in Japanese Patent Application No. 2017-120382 filed on Jun. 20, 2017, the entire contents of which are incorporated herein by reference.

It should be noted that various modifications or changes can be made for the above-described embodiments without departing from the new and advantageous characteristics of the present invention. Accordingly, all the modifications or changes are intended to be included in the accompanying claims.

The invention claimed is:

1. A laser processing machine comprising:
a profile selector that includes at least one beam-forming lens refracting a laser beam and configured
to emit a divergent laser beam having a beam profile selected from one of a plurality of different beam profiles, each having a different cross-sectional intensity distribution, and
to change the cross-sectional intensity distribution of the beam profile of the divergent laser beam by selecting a different beam profile;
a collimating lens through which the divergent laser beam with the changed cross-sectional intensity distribution emitted from the profile selector is incident, and configured to convert the divergent laser beam into a collimated laser beam having the changed cross-sectional intensity distribution;
a focusing lens configured to focus the collimated laser beam emitted from the collimating lens and having the changed cross-sectional intensity distribution, and to project the focused laser beam having the changed cross-sectional intensity distribution onto a sheet metal of a processing target; and
a moving mechanism configured to move the collimating lens along an optical axis to reduce a deviation of a focal point caused when the beam profile of the focused laser beam emitted from the focusing lens is changed, thereby changing the cross-sectional intensity distribution of the collimated laser beam, by selecting a different beam profile with the profile selector.

2. The laser processing machine according to claim 1, wherein the beam profile of the laser beam incident on the profile selector is a Gaussian beam profile, and
the profile selector comprises a non-beamforming portion and a facet lens as a beam-forming lens, the non-beamforming portion emitting a Gaussian laser beam as the Gaussian laser beam without beamforming, and the facet lens converting a Gaussian laser beam into a top-hat laser beam through beamforming.

3. The laser processing machine according to claim 1, wherein the beam profile of the laser beam incident on the profile selector is a Gaussian beam profile, and
the profile selector comprises a non-beamforming portion and an axicon lens as a beam-forming lens, the non-beamforming portion emitting a Gaussian laser beam as the Gaussian laser beam without beamforming, and the axicon lens converting a Gaussian laser beam into a ring laser beam through beamforming.

4. The laser processing machine according to claim 1, wherein the beam profile of the laser beam incident on the profile selector is a Gaussian beam profile, and
the profile selector comprises a non-beamforming portion, a facet lens as a first beam-forming lens, and an axicon lens as a second beam-forming lens, the non-beamforming portion emitting a Gaussian laser beam as the Gaussian laser beam without beamforming, the facet lens converting a Gaussian laser beam into a top-hat laser beam through beamforming, and the axicon lens converting a Gaussian laser beam into a ring laser beam through beamforming.

5. The laser processing machine according to claim 4, wherein the profile selector comprises a base plate that is disposed such that the non-beamforming portion, the facet lens, and the axicon lens are positioned on one circumference, and
the laser processing machine further comprises a rotation mechanism configured to rotate the base plate in order to select the beam profile of the laser beam emitted from the profile selector from among the Gaussian beam profile, a top-hat beam profile, and a ring beam profile.

6. The laser processing machine according to claim 1, wherein a laser beam of a divergent beam emitted from an emission end of a process fiber that transmits a laser beam emitted from a laser oscillator is incident on the collimating lens, and
the profile selector is disposed between the emission end and the collimating lens.

* * * * *